Dec. 24, 1968  J. R. DIECKMANN ETAL  3,418,191
APPARATUS FOR APPLYING ELASTOMERIC MATERIAL TO
A VEHICLE TIRE CARCASS
Filed Dec. 31, 1964  5 Sheets-Sheet 1

3,418,191
APPARATUS FOR APPLYING ELASTOMERIC MATERIAL TO A VEHICLE TIRE CARCASS

James Robert Dieckmann, Cuyahoga Falls, Ohio, and Walter Franklin Bishop, Colonial Heights, Va., assignors to The Firestone Tire & Rubber Company, Akron, Ohio, a corporation of Ohio
Filed Dec. 31, 1964, Ser. No. 422,797
9 Claims. (Cl. 156—397)

ABSTRACT OF THE DISCLOSURE

Apparatus for applying an endless thread portion to a tire carcass including a carriage moveable toward and away from the carcass and supplied with a continuous ribbon traversing over the carcass surface, wherein a single power means is connected to rotate the carcass and to traverse the ribbon carriage; and, selectively, a contour follower reflecting the buildup of the ribbon in comparison to a desired outline.

---

This invention relates generally to the vehicle tire art and more specifically to improved apparatus for producing an endless tread portion of elastomeric material on a vehicle tire carcass.

Recent developments in the tire art relating to applying the tread rubber and in some cases the sidewalls to a vehicle tire carcass have proposed production of the tire tread and sidewalls in an endless band circumscribing the tire carcass. These proposals involve winding onto the tire carcass a ribbon or strip of elastomeric tire material in the form of a series of convolutions resulting in an endless or non spliced tread being produced on the tire. A particular advantage of the endless tire tread stems from the fact that, in comparison with the prior technique where a single length tread rubber is wrapped around the tire carcass and butt spliced, it is possible to obtain more uniform and balanced tire products. Also, the possibility of separation of the butt spliced joint while the tire is in use which existed with tire tread produced by the prior technique is avoided by the technique of winding a ribbon or strip of tread material in a multitude of convolutions onto the tire carcass not to mention avoidance of the problem of obtaining the exact proper length of tread rubber for each tire carcass so that the length will be such as to just circumscribe the carcass and exactly butt join at its ends.

Hanson Reissue Patent 25,349 issued Mar. 12, 1962, exemplifies the recent prior art proposals for winding the tire tread and/or sidewalls onto a tire carcass by employing a strip of ribbon of elastomeric tire tread material. The instant invention presents improved apparatus for producing an endless tread rubber portion on a vehicle tire carcass and may also be employed in building the sidewalls on a tire carcass.

It is a principal object of the instant invention to provide improved apparatus useful for applying an endless tread and/or sidewall portion to a vehicle tire carcass, the carcass being built up in the conventional new tire building manner to include overlapping layers of rubberized cord material in the form of a band with tire beads at the ends of the band or it may be a used tire carcass to which an endless tire tread is to be applied in a retreading operation.

A further important object of the instant invention is to provide apparatus for applying an endless tread portion on a vehicle tire carcass wherein a calendered ribbon of elastomeric tire tread material is produced with an enlarged cross sectional central section and thin projections extending from opposite edges of the ribbon so that in winding the ribbon onto the tire carcass more uniform or smooth lay of the ribbon on the carcass with effective exclusion of air from between the ribbon convolutions may be achieved.

Another object of the instant invention resides in providing apparatus for applying an endless tread portion to a vehicle tire carcass wherein a carriage supplied with a continuous ribbon to be wound onto the carcass is traversed over the surface of the carcass and a contour follower wheel passes over the surface of the carcass and is connected to move a stylus that provides an indication of the contour of tread material build up approaching the desired distribution of tread material on the finished carcass.

It is also an object of the instant invention to provide apparatus for applying an endless tread portion to a tire carcass wherein a single power means is operable to rotate the carcass for winding of a ribbon of material thereon and also traverse a carriage over the carcass surface to distribute the ribbon convolutions, the supporting frame for the carriage being movable toward and away from the carcass with the drive connection between the carriage and the power means being maintained uninterrupted.

An additional object of the instant invention is to provide an apparatus for applying an endless tread portion to a vehicle tire carcass incorporating an improved drive for shuttling a carriage back and forth over the carcass surface at a predetermined traverse speed and for selectively rapidly moving the carriage to the side of the carcass surface when the tread portion has been applied to the carcass.

The above and other objects of the instant invention will be more readily apparent by reference to the accompanying drawings in which a preferred embodiment is disclosed by way of example, various modifications and changes in details thereof being contemplated within the scope of the appended claims. Apparatus embodying the invention is illustrated on the accompanying drawings in which:

Figure 1:
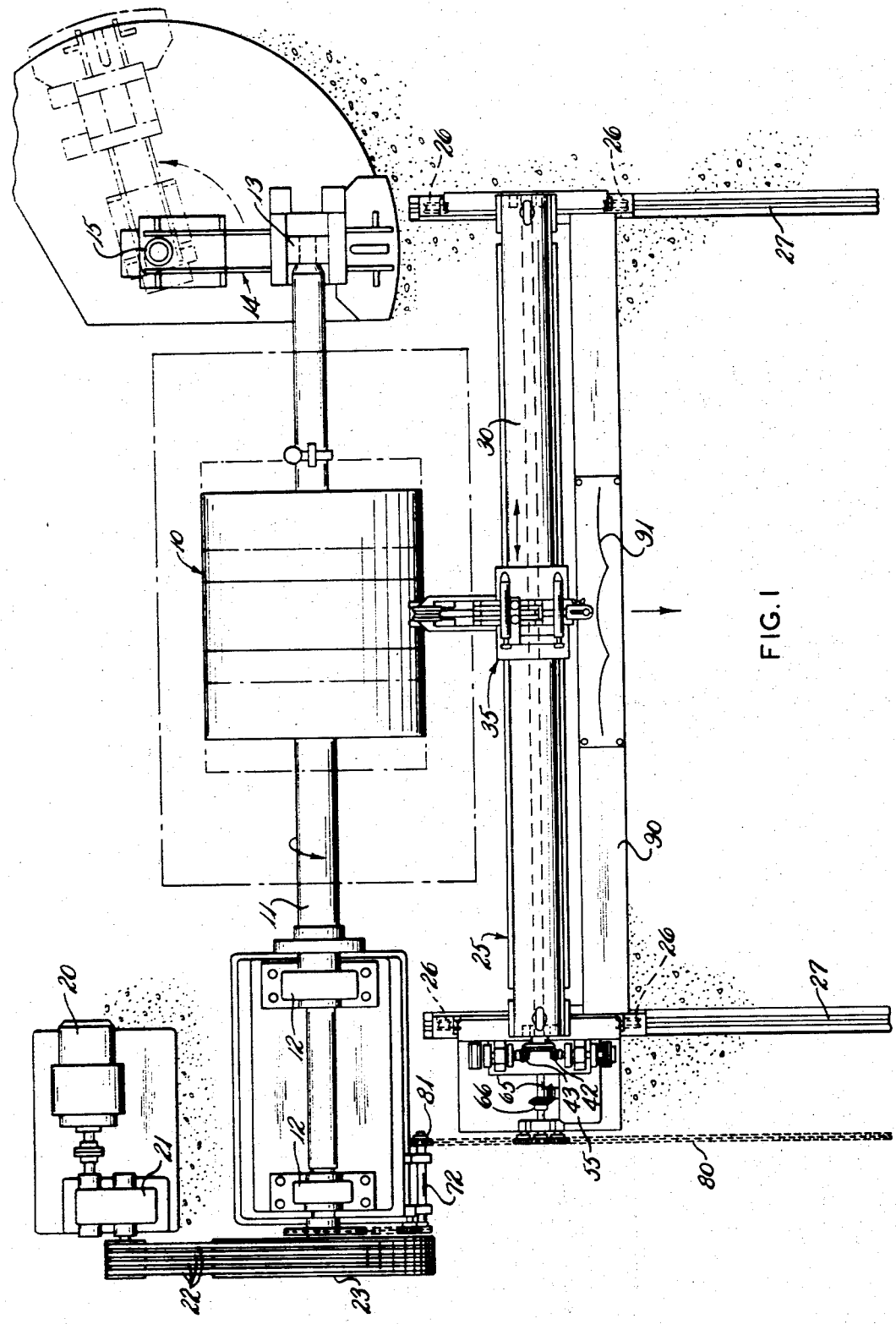
FIGURE 1 is a plan view of apparatus for applying elastomeric material in ribbon form to a tire carcass, certain details of the structure being illustrated only diagrammatically for clarity in showing the more important parts of the apparatus.
Figure 5:
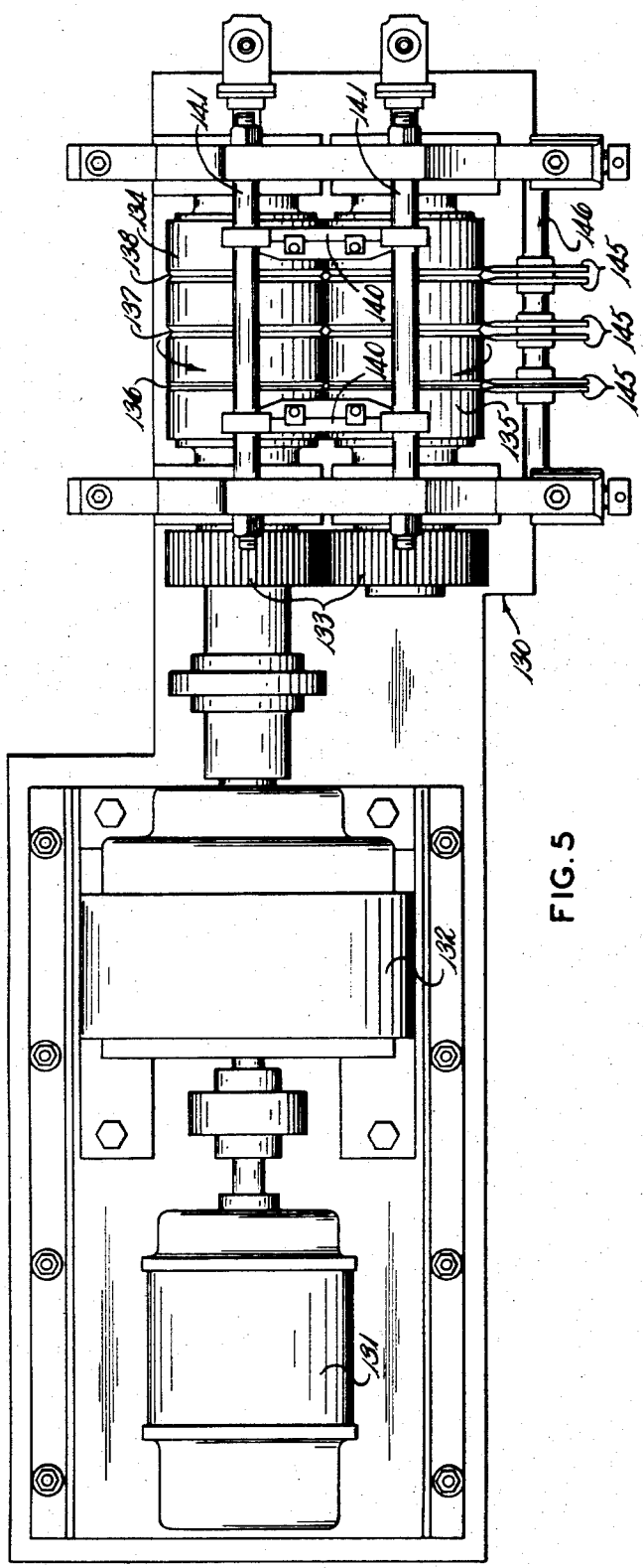
FIGURE 5 is a plan view of the particular calender construction employed as a part of the tread applying machine.

Referring to the drawings the plan view of FIGURE 1 illustrates the arrangement of the various components forming the tread applying apparatus with the exception of the ribbon forming calender which is shown in FIGURE 5 and which provides different sized ribbons and ribbons of preferred cross sectional shape to be wound onto a tire carcass, producing a tread portion thereon.

In FIGURE 1 a drum 10 is shown secured on a mandrel 11 which is rotatably mounted at one end in bearings 12 on a suitable floor supported base. The drum is illustrative of a suitable support to carry a tire carcass during application of the tread portion and/or sidewall portion thereto. The phantom line showings on FIGURE 1 illustrate how different sized drums may be employed to handle tire carcasses of various sizes. It will, of course, be appreciated that in employing the apparatus to retread a used tire carcass an appropriate mounting drum for such a carcass will be provided. The end of mandrel 11 opposite bearings 12 is shown suitably supported in a bearing 13 carried by a hanger 14. The hanger is supported on a vertical post 15 so that the hanger and bearing 13 thereon can be disengaged from mandrel 11 and swung to the phantom position shown on FIGURE 1, for placement on the drum of a carcass to which a tread portion is to be applied and for changing drum 10.

The mandrel 11 carrying drum 10 is driven by a suitable power means illustrated on FIGURE 1 as an electric motor 20 coupled through a reducer 21 and belts 22 to a drive pulley 23 secured to one end of mandrel 11. This power means is also coupled through power transmission means to be described hereinafter that are operable to move the ribbon receiving carriage in applying the ribbon as a series of convolutions distributed over the carcass in building up the tread portion.

Figure 3:
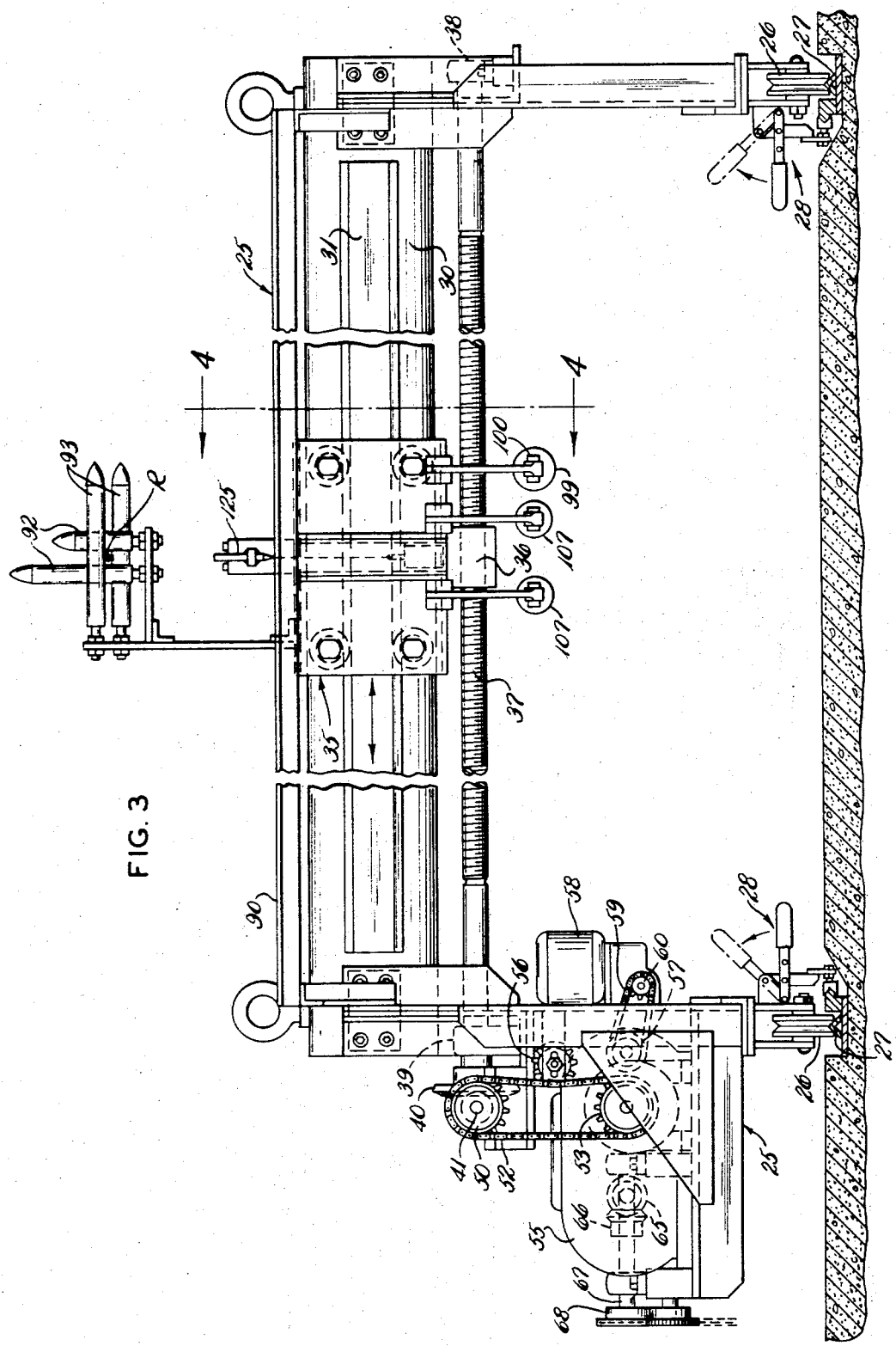
FIGURE 3 is a front elevation taken generally on line 3—3 of FIGURE 2 but with the carcass supporting drum, drive therefor and related parts not shown behind the ribbon applying assembly.

A frame 25 is disposed generally parallel to the rotational axis of drum 10. This frame is supported on wheels 26 which ride on parallel tracks 27. These tracks extend away from the drum and guide movement of the frame from its working position adjacent the drum surface. This facilitates placement on the drum of a carcass to which a tread portion is to be applied and changing the drum. As shown in FIGURE 3 clamps 28 are provided at the base of the frame 25 adjacent the wheels 26. These clamps are manually operable to engage with members mounted along the tracks 27 and clamp the frame in a fixed position while the application of a tread portion to the carcass is being carried out.

Figure 4:
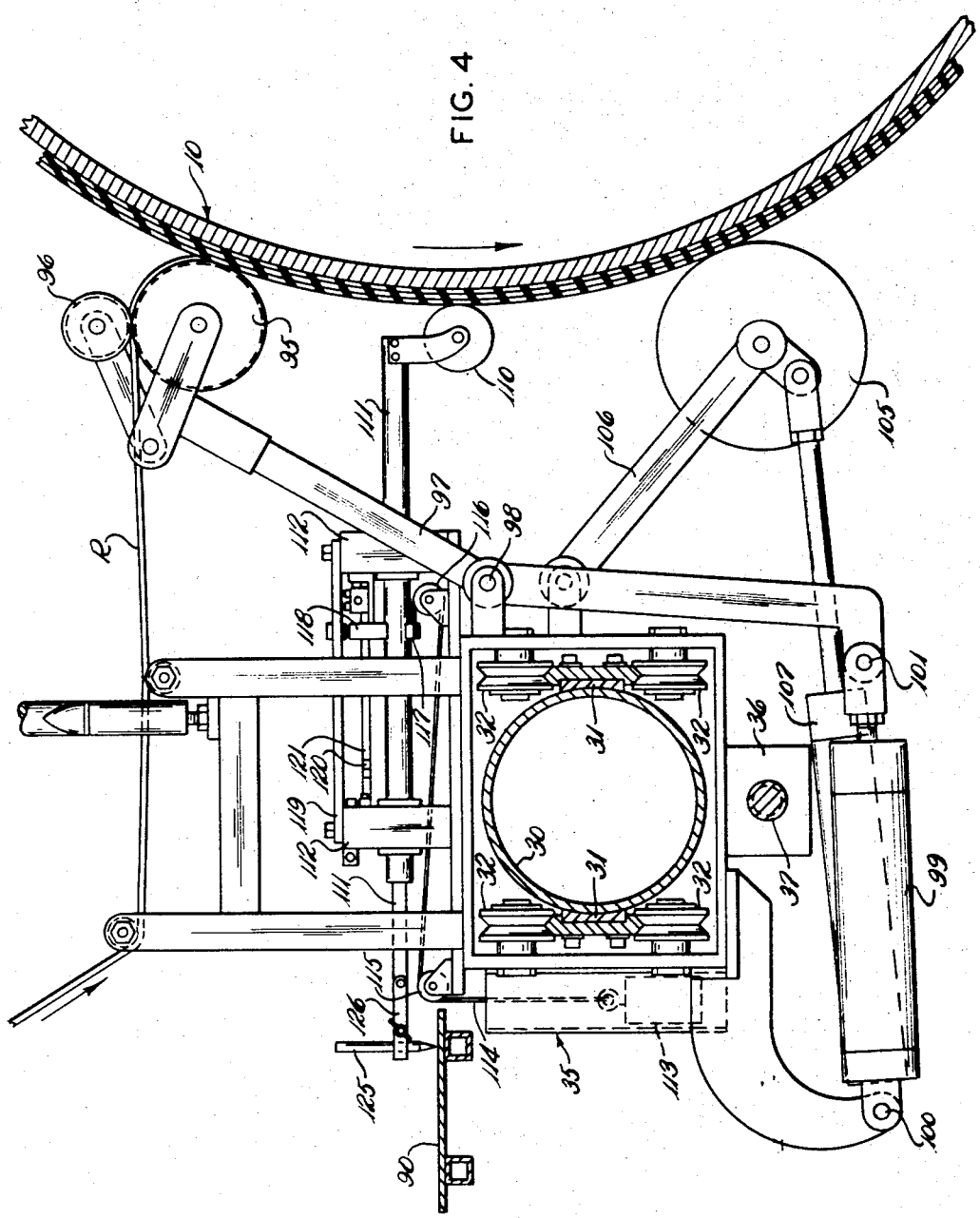
FIGURE 4 is a sectional view taken generally on line 4—4 of FIGURE 3.

In the structure of frame 25, as illustrated, a tubular member 30 extends between the end sections of the frame. As shown best in section on FIGURE 4 tubular member 30 has mounted along its opposite sides rails 31 which are engaged by rollers 32 in turn mounted on a carriage 35. By this construction, carriage 35 is mounted so that it can shuttle or traverse back and forth along the tubular member 30 of frame 25. An internally threaded member 36 is secured to the underside of carriage 35 and is threadably engaged with a feed screw 37.

Figure 2:
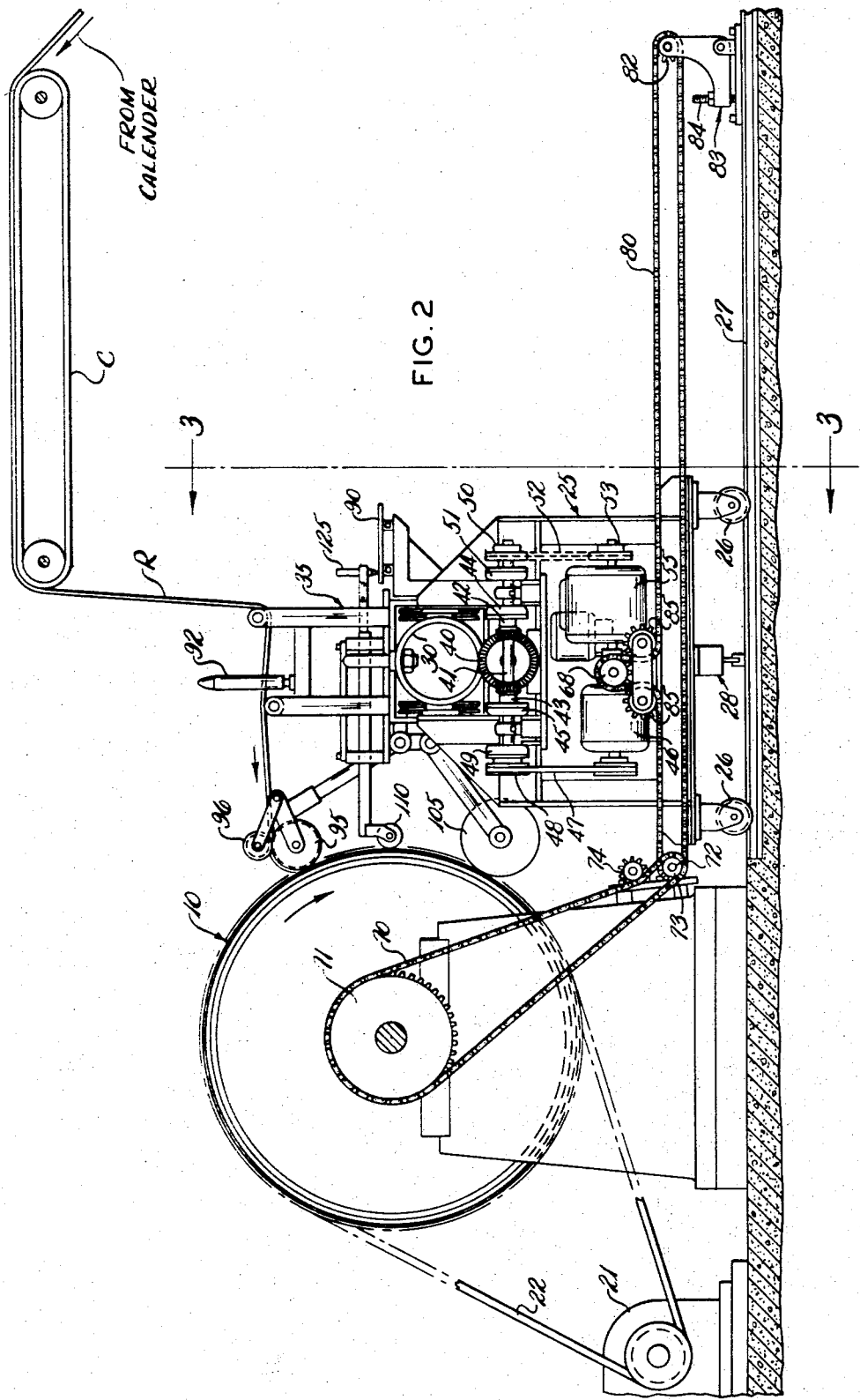
FIGURE 2 is an end elevation of the apparatus of FIGURE 1 with the drive pulley for the carcass mounting drum shown in phantom so as to better illustrate the drive means which powers the ribbon applying carriage.

As shown in FIGURE 3 the feed screw extends along frame 25 and is journaled in bearings 38 and 39 supported on the end sections of frame 25. The end of screw 37 adjacent bearing 39 has a main bevel gear 40 secured thereto. A shaft 41 is mounted in bearings on the frame 25 to extend across the end and intersect the axis of screw 37. A pair of bevel pinions 42 and 43 are journaled on shaft 41. These pinions mesh with the opposite sides of the bevel gear 40 as shown in FIGURES 1 and 2. A clutch 44 is also mounted on shaft 41 with one side of the clutch being fixed to bevel pinion 42 and the other clutch half secured to rotate with shaft 41. Similarly a clutch 45 is mounted on shaft 41 with one clutch half thereof fixed to bevel pinion 43 and the other clutch half secured to rotate with shaft 41. Thus, by actuating clutch 44 with clutch 45 disengaged, for any given direction of rotation of shaft 41, the feed screw 37 will be driven in one direction of rotation through bevel gear 40 and consequently the carriage 35 moved in one direction along frame 25. With shaft 41 still rotating in this given direction, the actuation of clutch 45 while clutch 44 is disengaged will drive feed screw 37 in the opposite direction and in turn carriage 35 will traverse along frame 25 in the opposite direction.

Shaft 41 may be driven from either of its ends depending upon the particular mode of operation and speed of movement desired for carriage 35. As illustrated an electric motor 46 is mounted on frame 25. The V-belt pulley on this motor is connected through belt 47 to a pulley 48 which is journaled on one end of shaft 41. A clutch 49 is mounted in association with pulley 48 with one half of the clutch fixed to the pulley and the other clutch half secured to rotate with shaft 41. With clutch 49 engaged and motor 46 energized, shaft 41 will be rotated and corresponding movement transmitted to carriage 35 through feed screw 37 and the bevel gear 40 assuming that one or the other of clutches 44 and 45 is engaged.

Motor 46 is only provided to produce rapid movement of carriage 35 along frame 25 as is desired when a tread portion has been built up on a carcass and it is desired that the carriage be moved out of the way for placement of another carcass on the carcass carrying drum. As will be described hereinafter, during the normal tread applying operation while the ribbon convolutions are being wound onto the drum carried carcass, motor 46 is deenergized and likewise clutch 49 disengaged to free shaft 41 for drive from its opposite end as described hereinafter.

The opposite end of shaft 41 has a sprocket 50 journaled thereon and connected through a clutch 51 to the shaft 41 by one half of such clutch being fixed to sprocket 50 and the other clutch half secured to rotate with shaft 41. A chain 52 is engaged with sprocket 50 and also is drivingly connected to a sprocket 53 on the output of a variable speed reducer 55. A suitable tensioning idler 56 (FIGURE 3) is mounted on frame 25 to maintain chain 52, properly engaged with sprockets 50 and 53.

Preferably the clutches 44, 45, 49 and 51 are of an electromagnetic type such that each can be selectively engaged or disengaged by connections involving no more than an appropriate electric circuit. With this type of clutch each of the clutches can be selectively engaged or disengaged from any location remote from the physical location of the individual clutches. These selective clutch actuations are performed for the particular speed and/or direction of traverse desired in connection with the ribbon applying operation and upon completion of the application of a tread portion to a carcass.

The speed reducer 55 illustrated on FIGURES 2 and 3 is a commercially available type as manufactured by Link Belt Company of Chicago, Ill., wherein the positive drive speed ratio between the input and output shafts can be adjusted by means of an adjusting knob 57. In the model illustrated this knob is a sprocket coupled to a motorized adjusting unit 58 by means of chain 59 extending over the sprocket knob and around sprocket 60 on the adjusting unit 58. The provision of a motorized adjusting unit 58 permits the operator of the ribbon applying apparatus to vary as may be required the traverse speed of carriage 35 relative to the rotating speed of drum 10 so that the ribbon convolutions will be properly and smoothly laid onto the carcass on the drum. It will be appreciated from subsequent description of the drive connection to the input of reducer 55 that variation of the speed ratio by means of reducer 55 is employed with the single drive motor 20 to alter the ratio between rotation of the carcass carrying drum and the rotative speed of feed screw 37 which causes traverse of carriage 35 along frame 25.

The input of speed reducer 55 carries a bevel gear 65 which meshes with a bevel gear 66 that is mounted on a shaft 67 extending laterally from the end of frame 25 and carrying a driving sprocket 68 at its outer end.

The power to drive sprocket 68 is supplied from the main driving motor 20 by a roller chain 70 driven from a sprocket 71 secured to rotate with mandrel 11. Roller chain 70 drives a stub shaft 72 through a sprocket 73 fastened to such shaft. An idler sprocket 74 is adjustably mounted to properly tension the roller chain 70 for engagement with the sprockets 71 and 73.

A chain loop 80 is drivingly engaged with a sprocket 81 (FIGURE 1) on stub shaft 72 and the outer end of said loop is trained over an idler sprocket 82. As shown more clearly in FIGURE 2 the idler sprocket 82 is supported on a bracket 83 hingedly fastened to the floor which supports the apparatus. This bracket is suitably adjustable by screw 84 to maintain appropriate tension in the chain loop 80. One run of the chain loop 80 passes beneath spaced idler sprockets 85 that are journaled on the end of movable frame 25 and then this chain run passes up between these idler sprockets and over driving sprocket 68.

It will be recognized from the description of the power transmission means given hereinabove that main motor 20 is connected to not only rotate the carcass carrying drum 10, but also supply driving power to rotate screw 37 and in turn traverse carriage 35 along frame 25. The provision of the chain loop 80 and the driving connection of one run of such loop with sprocket 68 permits the frame 25 and components carried thereon to be moved back from the drum 10 on tracks 27 without breaking or interrupting the driving connection extending back to the main motor 20. Thus, when the frame is moved back into position after a carcass has been placed on the drum 10 or when the frame 25 is repositioned to accommodate a different sized drum for a different carcass size, the driving relationship between the drum 10 and carriage 35 is continuously maintained.

In the normal application technique employed in winding the ribbon of elastomeric material onto the tire carcass, the main drive motor 20 will be operated to not only rotate the drum 10 but also, through the power transmission means with clutch 51 and either clutch 44 or 45 engaged, move the carriage 35 along the frame 25. At this time clutch 49 will be de-energized. Clutch 44 will be energized to rotate screw 37 in one direction while clutch 45 is de-energized or clutch 45 energized to rotate screw 37 in the opposite direction while clutch 44 is de-energized.

The frame 25 is provided with a table 90 extending along the forward edge of the frame where the machine operator stands in carrying out the machine operations. This table provides a surface on which can be supported an outline 91 (FIGURE 1) depicting the desired tread portion contour that is to be produced on the carcass by building up convolutions of the elastomeric ribbon material. This outline, used in connection with the stylus described hereinafter, can include a series or group of tread contour outlines which are to be followed by the machine operator in building up to the final desired tread contour by making several ribbon winding passes across the carcass. Thus each outline in the group would guide the operator as to the depth of build up that he should strive for at each point across the width of the carcass and for the particular ribbon winding pass represented by each outline of the group.

To guide the elastomeric ribbon R as it is received from the ribbon forming means such as the calender shown in FIGURE 5, the ribbon may be conveyed from the calender on an overhead conveyor C to pairs of spaced elongated guide spindles 92 and 93. Spindles 92 are rotatable about vertical axes to preliminarily guide the ribbon against undue lateral displacement and the spindles 93 are rotatable about horizontal axes to preliminarily align the ribbon against vertical displacement. The rotatably mounted spindles 92 and 93 are supported on carriage 35 and thus move with the carriage so that the ribbon is properly guided to the lay-down wheel 95 also carried by the carriage.

A roller 96 is associated with lay-down wheel 95 to grip the ribbon R so that it passes smoothly around wheel 95 and is pressed against the rotating carcass on drum 10. Lay-down wheel 95 is mounted on a bell crank 97 pivoted at 98 on the carriage with its opposite end connected to an extensible actuator 99, the cylinder of which is secured to carriage 35 at 100 and the piston rod of which is connected to bell crank 97 at 101. By appropriate introduction of motive fluid into one or the other end of actuator 99 the lay-down wheel 95 can be retracted from engagement with drum 10 or pressed against the drum when the ribbon R is being wound onto the drum for build up of a tread portion.

The carriage 35 also carries a stitcher roll 105 pivotally connected to the carriage by means of an arm 106 and pressed against the carcass on drum 10 or retracted from the drum by means of extensible actuators 107. The cylinders of these actuators are connected to the end of arm 106 so that introduction of appropriate motive fluid into the actuator will extend or retract the stitcher roller as in the case of the operation of actuator 99. The stitcher roll 105 is mounted on the carriage so as to engage the carcass at a point circumferentially spaced from lay-down wheel 95 whereby the ribbon pressed against the carcass as fed thereunto from the lay-down wheel is almost immediately firmly pressed against the carcass by stitcher roll 105 as drum 10 turns. This stitcher wheel promotes the exclusion of air from beneath or between the ribbon convolutions so that a solid elastomeric material build up is produced.

To indicate the progress of build up of a tread portion produced by winding the elastomeric ribbon R onto a carcass there is provided on carriage 35 a contour follower wheel 110. This wheel is mounted on a rod 111 which is reciprocably supported in spaced guides 112 fastened to the upper surface of carriage 35. The rod 111 and wheel 110 carried thereby are biased toward engagement with drum 10 by means of weight 113 suspended from cable 114 that passes over pulley 115, around pulley 116 and is secured to rod 111 at 117. Rod 111 carries detent 118 which extends upwardly between parallel guide bars 119 so that rod 111 is retained against rotation. Detent 118 is also engageable by a projection 120 on a latch member 121 when the rod 111 and wheel 110 thereon are drawn rearwardly. The manually releasable latch 121 is thus employed to retain rod 111 in its rearward position retracted from drum 10 while a tire carcass is being placed on the drum or a different sized drum being substituted.

The rod 111 carries a stylus 125 at its outer end mounted on a bracket 126 hingedly secured to the end of rod 111. This stylus overlies table 90 on frame 25 and moves in and out in accordance with the movements of the follower wheel over the contour of the tread portion that is built up by winding the ribbon onto the carcass. Since it is carried by the carriage 35 the stylus also traverses along table 90 as the carriage traverses along the surface of the carcass. Thus the stylus gives an indication, with reference to table 90, of the build up of the tread portion to determine when the desired contour of the tread portion, as reflected by any outline 91 supported on the table, has been accomplished.

Figure 7:
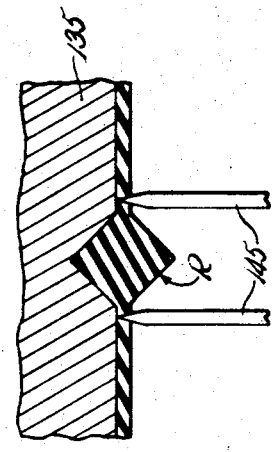
FIGURE 7 is a detailed sectional view showing how the ribbon of elastomeric material is slit from the calendered material on one of the calender rolls.
Figure 6:
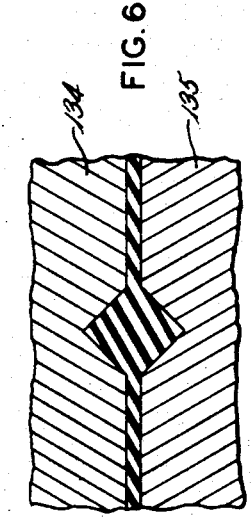
FIGURE 6 is a detailed sectional view showing the formation of the calendered elastomeric material between the calender rolls during calender operation.

A preferred construction for the calender operable to produce an elastomeric ribbon to be applied to a tire carcass and more specifically the preferred relationship of slitting knives to a grooved calender roll for producing the desired ribbon configuration are shown in FIGURES 5, 6 and 7. As illustrated in FIGURE 5 the calender 130 is driven by a suitable electric motor 131 through a reduction gear 132 coupled to gears 133. These intermeshed gears 133 act to simultaneously rotate the two calender rolls 134 and 135. Each calender roll has formed on the surface thereof several V-shaped grooves, each of different size. In the plan view of FIGURE 5, no elastomeric material is present in the calender and thus the rolls 134 and 135 are exposed showing the mating grooves 136, 137 and 138 and how they present generally diamond cross section openings at the bite of the calender rolls. End guides or retainers 140 are supported to retain a mass of elastomeric material overlying the bite of rolls 134 and 135. This material is worked between rolls 134 and 135 in operation of the calender to form it into a sheet of material as is conventional in calender operation. Retainers 140 are shown mounted on cross rods 141 as is usual in calender construction.

FIGURE 6 illustrates the cross section of the material passing between the calender rolls in the form of a thin sheet with a thickened rib at each location of a pair of mating grooves on the calender rolls. The grooves of different sizes produce different ribbon cross sections. Having these different ribbon sizes available is advantageous in that the appropriate ribbon cross sectional size for each tire carcass or tread portion contour to be built up can be most expeditiously selected.

Each of the grooves 136, 137 and 138 on calender roll 135 has a pair of slitting knives 145 associated therewith. These knives are supported on a rod 146 and may be adjusted therealong to have the proper spacial relationships to the respective roll grooves. Each pair of knives engages the surface of roll 135 a short lateral distance on each side of the particular calender roll groove with which the pair is associated. Thus a ribbon is slit from the calendered sheet of elastomeric material which has a diamond-shaped cross section with thin lateral projections extending along opposite edges of the diamond shape. These lateral projections providing feather edges along the edges of the ribbon are of advantage when the ribbon is pressed onto the carcass and adjacent ribbon convolutions. These feather edges more easily and effectively are pressed into firm continuous contact with the carcass or previous convolutions which they overlie resulting in a better bond of the convolutions to the carcass and to each other. The slitting relationship of the knives 145 to the calender roll groove to leave these feather edges on the ribbon is shown more clearly in FIGURE 7.

It is particularly important in applying the elastomeric ribbon convolutions on the tire carcass that, for each particular tire, proper build up of elastomeric material on the contour depicted, for example, by the outline 91 be achieved. This outline is formed to give an indication of the proper amount of elastomeric material to be applied to each part of the tire carcass surface so that thereafter the elastomeric material will fully and accurately form into the tread design when placed in the mold. In other words, the tire tread design is shaped in a mold from the elastomeric material that has been wound onto the tire carcass. Thus, there must be sufficient material, but not excess material, for proper forming of the tread design in the mold.

To achieve the desired contour and proper distribution of the elastomeric material which is wound in the form of convolutions on the tire carcass, the ribbon, supplied from a calender or extruder, can be stretched to thin it out as necessary to build up no more than the required thickness of material for each part on the carcass surface. Such stretching can, of course, be obtained by altering the rotating speed of the drum 10 or by increasing or decreasing the rate of ribbon production as by increasing or decreasing the calender roll speed. Thinning of the ribbon may also be obtained by increasing or decreasing the speed of the carriage traverse as is possible through changing the speed ratio of reducer 55. Also, the pressure applied on the stitcher wheel 105 may be increased or decreased to press the ribbon convolutions closer to the desired final contour. Where a calender with opposed mating grooves, such as shown in FIGURE 5, is employed as the means to produce the elastomeric ribbon, a different size of ribbon may be selected from among the pairs of opposed mating grooves and various sections of the tread portion built up as may be desired or required to approach with perfection the proper distribution of elastomeric material on the entire carcass.

It is to be undestood that the form of the invention herein shown and described is to be taken only as a preferred example of the same and that various changes in size, shape, arrangement of parts, et cetera, may be resorted to without departing from the invention or scope thereof intended by the appended claims.

We claim:
1. Apparatus for applying an endless tread portion to a vehicle tire carcass comprising
 a drum supported to rotate about its axis for carrying the carcass during application of the tread portion,
 a frame disposed generally parallel to the rotational axis of said drum, said frame being supported on wheels engaging parallel tracks extending away from said drum to enable said frame to be moved away from said drum thereby facilitating placement on said drum of a carcass to which a tread portion is to be applied,
 a carriage mounted to move along said frame and receive a ribbon of elastomeric tire tread material for application to the rotating carcass,
 power means coupled to rotate said drum and connected through power transmission means to move said carriage along said frame, said power transmission means including a chain loop extending parallel to said tracks with the outer end of said loop trained over an idler sprocket and the inner end coupled to be driven by said power means,
 a driving sprocket on said frame drivingly engaged with one run of said chain loop,
 a feed screw extending along said frame engaged with an internally threaded member secured to said carriage,
 a shaft mounted on said frame extending across one end of said screw,
 a main bevel gear on said one end of said screw and a pair of bevel pinions journaled on said shaft meshed with opposite sides of said bevel gear,
 clutch means for each of said bevel pinions selectively operable to drivingly connect the bevel pinions to said shaft,
 and means for connecting said driving sprocket to drive said shaft.

2. Apparatus as recited in claim 1 wherein said last named means comprises an adjustable speed reducer having its input connected to said driving sprocket and clutch means selectively operable to connect the output of said speed reducer to drive said shaft, and motor means is provided on said frame selectively connectible to drive said shaft for rapid movement of said carriage to one end of said frame upon completion of application of a tread portion to a tire carcass.

3. Apparatus for applying an endless tread portion to a vehicle tire carcass comprising
 a drum supported to rotate about its axis for carrying the carcass during application of the tread portion,
 a frame disposed generally parallel to the rotational axis of said drum, said frame being supported on wheels engaging parallel tracks extending away from said drum to enable said frame to be moved away from said drum to facilitate placement on said drum of a carcass to which a tread portion is to be applied,
 means on said frame to receive a continuous ribbon of elastomeric tire tread material and press it against the rotating carcass on said drum to build up the tread portion by winding the ribbon onto the carcass,
 power means coupled to rotate said drum and connected through power transmission means to said ribbon receiving means to move it along said frame and operate it in winding the ribbon onto the carcass, said power transmission means including a chain loop extending parallel to said tracks with the outer end of said loop trained over an idler sprocket and the inner end coupled to be driven by said power means, and a driving sprocket on said frame drivingly engaged with one run of said chain loop and connected to operate said ribbon receiving means.

4. Apparatus for applying an endless tread portion to a vehicle tire carcass comprising a drum supported to rotate about its axis for carrying the carcass during application of the tread portion, a frame disposed generally parallel to the rotational axis of said drum, said frame being supported on wheels engaging parallel tracks extending away from said drum to enable said frame to be moved away from said drum to facilitate placement on said drum of a carcass to which a tread portion is to be applied, a carriage mounted to move along said frame, said carriage having a lay-down wheel mounted to receive a continuous ribbon of elastomeric tire tread material and press it against the rotating carcass on said drum and a stitcher roll supported to engage the carcass at a point circumferentially spaced from said lay-down wheel, power means coupled to rotate said drum and connected through power transmission means to move said carriage along said frame, said power transmission means including a chain loop extending parallel to said tracks with the outer end of said loop trained over an idler sprocket and the inner end coupled to be driven by said power means, and a driving sprocket on said frame drivingly engaged with one run of said chain loop and connected to means operable to move said carriage along said frame.

5. Apparatus as recited in claim 4 wherein said means to move said carriage along said frame comprises a feed screw extending along said frame and engaged with an internally threaded member secured to said carriage.

6. Apparatus for applying an endless tread portion to a vehicle tire carcass comprising a drum supported to rotate about its axis for carrying the carcass during application of the tread portion, power means coupled to rotate said drum, a frame disposed generally parallel to the rotational axis of said drum, a carriage mounted to move along said frame and having means to receive a continuous ribbon of elastomeric tire tread material and press it against the rotating carcass on said drum to build up the tread portion by winding the ribbon onto the carcass, a feed screw extending along said frame engaged with an internally threaded member secured to said carriage, a shaft mounted on said frame extending across one end of said screw, a main bevel gear on said one end of said screw and a pair of bevel pinions journaled on said shaft meshed with opposite sides of said bevel gear, clutch means for each of said bevel pinions selectively operable to drivingly connect the bevel pinions to said shaft, and drive means to supply drive power to said shaft.

7. Apparatus as recited in claim 6 further comprising motor means mounted on said frame, clutch means operable to selectively connect said motor means to drive said shaft for rapid movement of said carriage to one end of said frame upon completion of application of the tread portion to a tire carcass, and clutch means selectively operable to connect said drive means to drive said shaft.

8. Apparatus for applying an endless tread portion to a vehicle tire carcass comprising a drum supported to rotate about its axis for carrying the carcass during application of the tread portion, power means coupled to rotate said drum, a frame disposed generally parallel to the rotational axis of said drum with a carriage mounted to move along said frame, a lay-down wheel rotatably mounted on an arm pivotally connected to said carriage and extensible actuator means connected between said arm and said carriage to press said lay-down wheel against the rotating carcass on said drum and apply a ribbon of elastomeric tire tread material to the carcass, a stitcher roll rotatably mounted on a second arm pivotally connected to said carriage and extensible actuator means connected between said second arm and said carriage to press said roll against the carcass at a point circumferentially spaced from said lay-down wheel and promote bonding of the ribbon convolutions wound onto the carcass, a table mounted on said frame providing a surface to support an outline of the desired tread portion contour to be produced on the carcass, a contour follower wheel rotatably secured to a rod which is reciprocably carried in guide means on said carriage with means biasing said follower wheel toward said drum, and a stylus supported on said rod to move across said table as said carriage traverses along the surface of the carcass and indicate build up of the tread portion as sensed by said contour follower wheel, and further comprising latch means associated with the mounting for said contour follower wheel to retain said follower wheel in retracted position while a carcass is being mounted on said drum.

9. Apparatus for applying an endless tread portion to a vehicle tire carcass comprising a drum supported to rotate about its axis for carrying the carcass during application of the tread portion, power means coupled to rotate said drum, a frame disposed generally parallel to the rotational axis of said drum with a carriage mounted to move along said frame, a lay-down wheel rotatably mounted on an arm pivotally connected to said carriage and extensible actuator means connected between said arm and said carriage to press said lay-down wheel against the rotating carcass on said drum and apply a ribbon of elastomeric tire tread material to the carcass, a stitcher roll rotatably mounted on a second arm pivotally connected to said carriage and extensible actuator means connected between said second arm and said carriage to press said roll against the carcass at a point circumferentially spaced from said lay-down wheel and promote bonding of the ribbon convolutions wound onto the carcass, a table mounted on said frame providing a surface to support an outline of the desired tread portion contour to be produced on the carcass, a contour follower wheel rotatably secured to a rod which is reciprocably carried in guide means on said carriage with means biasing said follower wheel toward said drum, and a stylus supported on said rod to move across said table as said carriage traverses along the surface of the carcass and indicate build up of the tread portion as sensed by said contour follower wheel, and further comprising spaced elongated rotatably mounted spindles carried by said carriage and positioned to guide and align the ribbon of elastomeric material with said lay-down wheel for accurate application to the carcass.

References Cited

UNITED STATES PATENTS

| | | | |
|---|---|---|---|
| Re. 25,349 | 3/1963 | Hanson | 156—397 X |
| 1,442,653 | 1/1923 | De Mattia | 156—405 X |
| 2,009,599 | 7/1935 | Woock | 156—130 X |

(Other references on following page)

UNITED STATES PATENTS

| | | | |
|---|---|---|---|
| 2,665,757 | 1/1954 | Stevens et al. | 156—405 X |
| 3,002,874 | 10/1961 | Lowe | 156—397 |
| 3,062,270 | 11/1962 | Riddle | 156—405 |
| 3,113,738 | 12/1963 | Vanzo | 156—397 X |
| 3,170,499 | 2/1965 | Deist | 156—397 X |
| 3,223,572 | 12/1965 | Halloway et al. | 156—397 |
| 3,264,162 | 8/1966 | Holman | 156—397 |

FOREIGN PATENTS 1,285,727  1/1962  France.

EARL M. BERGERT, *Primary Examiner.*

C. B. COSBY, *Assistant Examiner.*

U.S. Cl. X.R.

156—130, 405